(12) United States Patent  
Ito

(10) Patent No.: US 7,599,036 B2  
(45) Date of Patent: Oct. 6, 2009

(54) IN-PLANE SWITCHING ACTIVE MATRIX LIQUID CRYSTAL DISPLAY APPARATUS

(75) Inventor: Hideki Ito, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 151 days.

(21) Appl. No.: 11/802,921

(22) Filed: May 25, 2007

(65) Prior Publication Data

US 2008/0002078 A1    Jan. 3, 2008

(30) Foreign Application Priority Data

May 29, 2006    (JP)    .............................. 2006-148461

(51) Int. Cl.  
*G02F 1/1343* (2006.01)

(52) U.S. Cl. ........................ 349/141; 349/48; 349/129

(58) Field of Classification Search .................. 349/141  
See application file for complete search history.

(56) References Cited

U.S. PATENT DOCUMENTS

2003/0117558 A1*    6/2003    Kim et al. .................... 349/141  
2006/0146254 A1*    7/2006    Kim ............................ 349/141  
2006/0187392 A1*    8/2006    Okamoto et al. ............ 349/114

FOREIGN PATENT DOCUMENTS

JP    2004-354407    12/2004

* cited by examiner

*Primary Examiner*—Frank G Font  
*Assistant Examiner*—Eric Wong  
(74) *Attorney, Agent, or Firm*—McGinn IP Law Group, PLLC

(57) ABSTRACT

In an in-plane switching active matrix LCD apparatus wherein a liquid crystal layer is sealed between a pair of transparent substrates and pectinate pixel electrodes and common electrodes are formed on the transparent substrates, a transparent continuous solid electrode that evenly covers the pixel is provided via a transparent insulating film to the bottom layers of the pixel electrodes and common electrodes, and this transparent continuous solid electrode is in an electrically floating state. Transmissivity can thereby be improved with a simple configuration.

20 Claims, 5 Drawing Sheets

IN-PLANE SWITCHING ACTIVE MATRIX LIQUID CRYSTAL DISPLAY APPARATUS

BACKGROUND OF THE INVENTION

1. Field of the Invention

The present invention relates to an in-plane switching active matrix liquid crystal display (LCD) apparatus that has improved transmissivity.

2. Description of the Related Art

FIG. 1 is a cross-sectional view showing the operation of a conventional in-plane switching LCD apparatus, and FIG. 2 is a cross-sectional view schematically depicting a pixel of an in-plane switching LCD apparatus of the related art. In the related art in-plane switching LCD apparatus as shown in FIG. 2, a liquid crystal layer 102 is provided between a pair of transparent substrates 101a, 101b, and pectinate pixel electrodes 103 and common electrodes 104 are disposed on the transparent substrate 101a in the aperture of the pixel.

When an image is displayed in the related art in-plane switching LCD apparatus thus configured, different voltages are applied between the pixel electrodes 103 and the common electrodes 104 to generate a horizontal electric field substantially parallel to the substrate surface between these electrodes, and this horizontal electric field causes the liquid crystal molecules between the electrodes to rotate within a plane substantially parallel to the substrate surface. Since images are displayed through rotation of the liquid crystal molecules within a plane parallel to the substrate surface, the viewing angle is not dependent on the rise angle of the liquid crystal molecules, which allows for a display with a wider viewing angle free of grayscale inversion.

The LCD apparatus disclosed in Japanese Laid-open Patent Application No. 2004-354407 (hereinafter Patent Document 1) is an example of a conventional in-plane switching LCD apparatus such as is described above. Patent Document 1 discloses an example of a configuration in which pixel electrodes and common electrodes are formed on one of a pair of opposing substrates, first continuous solid electrodes are provided via an insulating film on the bottom layers of the pixel electrodes and common electrodes on this substrate, and second continuous solid electrodes are formed on the liquid crystal layer side of the other substrate opposing the first substrate.

When an image is displayed in the conventional LCD apparatus having this configuration disclosed in Patent Document 1, voltages are applied between the pixel electrodes and the common electrodes, and the liquid crystal molecules are driven under the action of an electrical field substantially parallel to the substrate surface. In the initial stage of the image non-display state, voltage is applied between the first continuous solid electrodes and the common and pixel electrodes, as well as between the second continuous solid electrodes and the common and pixel electrodes without being applied between the pixel electrodes and the common electrodes. This generates a vertical electric field and raises the liquid crystal molecules, displaying a black screen. Following the initial stage of the image non-display state, the electrodes are brought to the same electric potential, whereby the pixel interiors lose their electric field, the raised liquid crystal molecules revert to their initial alignments, and the black display remains. Generating a vertical electric field in the initial stage of the image non-display state makes it possible to reduce rise-and-fall response time, to inhibit blurring of moving images, and to provide high-quality moving images.

However, the conventional technology described above has the following problems.

In a conventional in-plane switching active matrix LCD apparatus, since pectinate electrodes are formed inside the pixels on one of the substrates, the apertures are inevitably smaller, causing transmissivity to be reduced. In particular, there have been problems with low transmissivity in LCD apparatuses because the liquid crystal molecules on the electrodes cannot be driven.

SUMMARY OF THE INVENTION

An object of the present invention is to provide an in-plane switching active matrix LCD apparatus wherein transmissivity is improved by a simple configuration.

The in-plane switching active matrix LCD apparatus according to the present invention has a first substrate, a second substrate facing the first substrate, a liquid crystal layer provided between the first and second substrates, data lines and gate lines that are formed on the first substrate and that intersect in matrix fashion, a thin-film transistor formed on the first substrate in each pixel area partitioned by the data lines and gate lines, a common line formed on the substrate and used to apply a reference potential across the pixels, pixel electrodes and common electrodes formed in the pixel areas on the first substrate and used to generate a horizontal electric field parallel to the substrate surfaces, and a transparent continuous solid electrode formed via a transparent insulating layer on the bottom layers of the pixel electrodes and common electrodes on the first substrate.

The transparent continuous solid electrode is preferably in an electrically floating state.

The transparent continuous solid electrode can be formed uniformly so as to cover the apertures of the pixels.

The pixel electrodes and the common electrodes can be made from transparent electrodes.

The pixel electrodes and the common electrodes may be formed in pectinate or comb-like shapes (hereinafter called as pectinate shapes) that mesh with each other.

The pixel electrodes and the common electrodes may be formed on the same layer.

The transparent continuous solid electrode may be formed on the same layer as the gate lines and the common line. Alternatively, the transparent continuous solid electrode may be formed between the gate lines and common line via a transparent insulating layer.

According to the present invention, in an in-plane switching active matrix LCD apparatus, pectinate electrodes for generating a horizontal electric field are formed on a substrate, and a transparent continuous solid electrode is provided via a transparent insulating layer underneath the electrodes on the substrate, whereby a horizontal electric field is applied to a liquid crystal layer on the pectinate electrodes, the horizontal electric field varies the alignment of liquid crystal molecules above the pectinate electrodes, and the transmissivity above the pectinate electrodes is improved. Thus, the transmissivity of the LCD apparatus can be improved without changing the width and/or spaces between the pectinate electrodes. The contrast also improves proportionate to the improvement in transmissivity.

DESCRIPTION OF THE PREFERRED EMBODIMENTS

In view of above-noted problems, an object of the present invention is to improve transmissivity by focusing on the alignment of liquid crystal molecules and by improving the liquid-crystal molecular alignment when an image is displayed. In Patent Document 1, continuous solid electrodes are formed on the bottom layers of the pixel electrodes and the common electrodes in the same manner as in the present invention. However, continuous solid electrodes are also formed on the opposing substrate, and the purpose of this arrangement is to quickly produce a black display in the initial stage of the image non-display state. In the present invention, the continuous solid electrodes are preferably kept in an electrically floating state. By contrast, in Patent Document 1, the continuous solid electrodes are not kept in an electrically floating state. Specifically, if the continuous solid electrodes are brought to an electrically floating state in the configuration in Patent Document 1, the desired black display in this document is not achieved, and transmissivity is reduced by the continuous solid electrodes formed on the opposing substrate.

Figure 3:
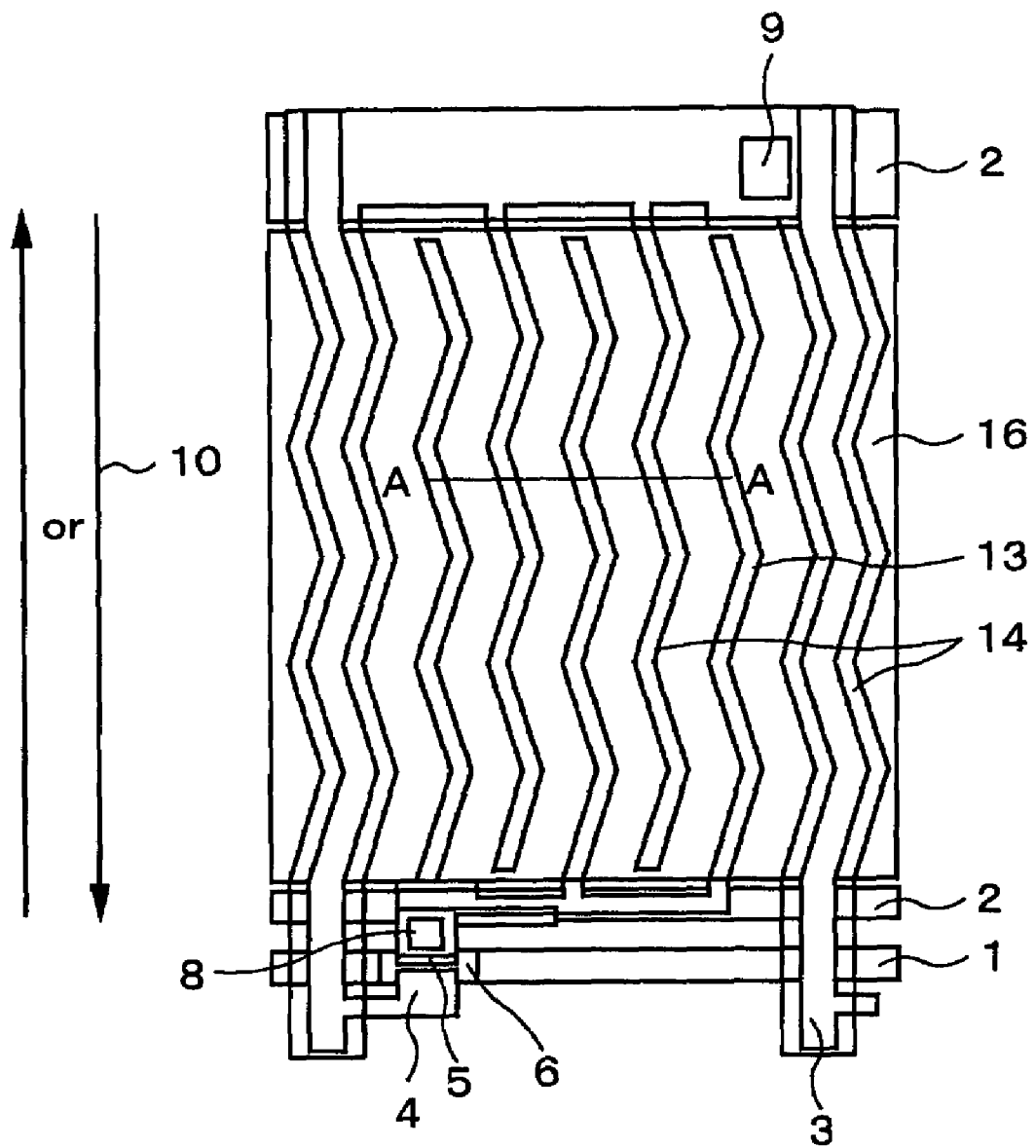
FIG. 3 is a plan view showing a pixel of the in-plane switching active matrix LCD apparatus according to an exemplary embodiment of the present invention.
Figure 4:
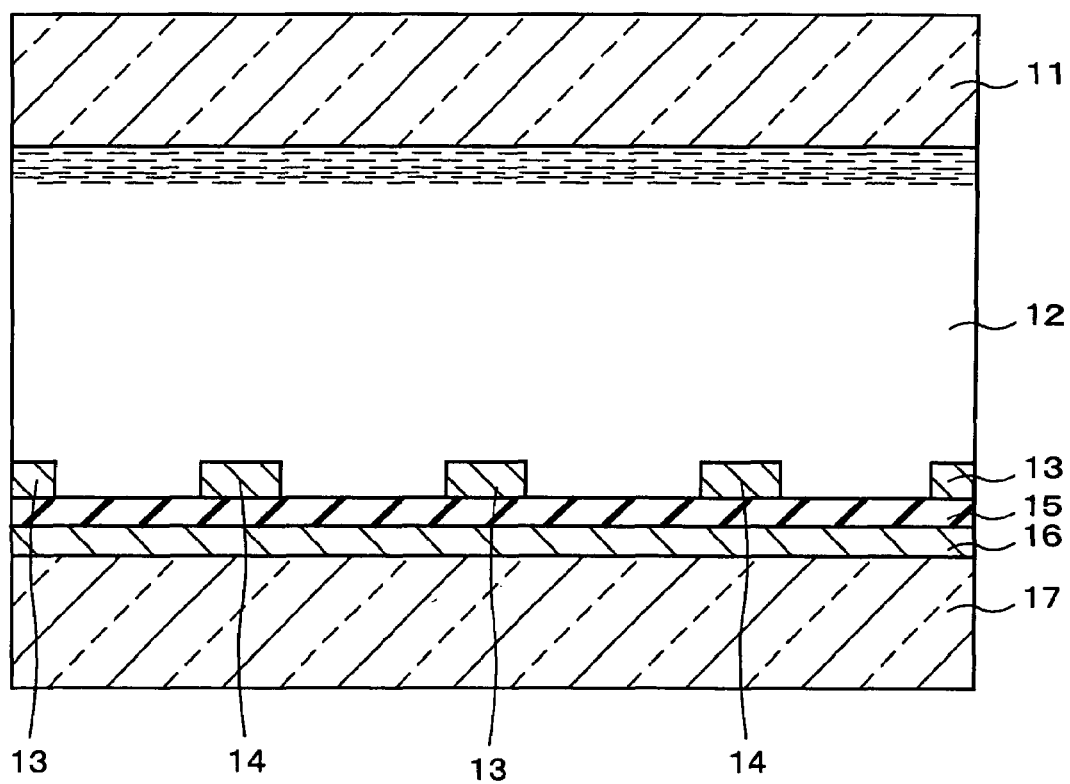
FIG. 4 is a cross-sectional view along the line A-A in FIG. 3.

Exemplary embodiments of the present invention are described in detail below with reference to the attached diagrams. FIG. 3 is a plan view showing a pixel of the in-plane switching active matrix LCD apparatus according to an exemplary embodiment of the present invention, and FIG. 4 is a cross-sectional view along the line A-A in FIG. 3.

The LCD apparatus of the exemplary embodiment operates on an active matrix principle. The display area of the liquid crystal panel is composed of multiple pixels partitioned by multiple gate lines and data lines arranged in matrix-fashion, and a thin film transistor (TFT), which is a switching element, is formed on each pixel. A gate line 1 and a common line 2 are formed on a transparent substrate 17 and are disposed parallel to each other, as shown in FIGS. 3 and 4. A transparent continuous solid electrode 16, which is transparent and electroconductive, is formed on the transparent substrate 17 on which the gate line 1 and common line 2 are formed, and the transparent continuous solid electrode 16 has a square shape so as to uniformly cover the aperture of the pixel. The transparent continuous solid electrode 16 is electrically independent in a so-called floating state, and is formed so as to be electrically insulated from the gate line 1 and the common line 2. The transparent continuous solid electrode 16 is formed from, e.g., ITO (indium tin oxide) or another such transparent electroconductive material.

A gate-insulating film (not shown) is stacked over the gate line 1, the common line 2, and the transparent continuous solid electrode 16. The configuration is otherwise the same as a typical in-plane switching active matrix LCD apparatus. Specifically, an a-Si (amorphous silicon) layer 6 is formed at a specific location on the gate line 1 via a gate-insulating film, and a source electrode 4 and drain electrode 5 are formed so as to cover the a-Si (amorphous silicon) layer 6 from the two lateral ends of the gate line 1. A data line 3 is formed so as to be connected with the source electrode 4 and to extend in a direction orthogonal to the gate line 1. Thus, a thin-film transistor is formed in the vicinity of the points of intersection between the gate lines 1 and the data lines 3 of each pixel. Furthermore, a transparent insulating film 15 is stacked so as to cover the data line 3, the source electrode 4, the drain electrode 5, and the gate-insulating film. Two layers, referred to as a semiconductor layer and a contact layer, are typically stacked on the a—Si layer in order to improve the characteristics of the thin-film transistor.

Pectinate pixel electrodes 13 and common electrodes 14 are formed on the pixel area on the transparent insulating film 15 so as to mesh with each other. These pixel electrodes 13 and common electrodes 14 are formed from ITO or another such transparent electroconductive material. In one example of the pectinate shape, a series of "V" shapes is aligned in the extending direction of the comb teeth as shown in FIG. 3, and except for the curved parts, the pixel electrodes 13 and the common electrodes 14 are arranged parallel to each other. The shapes of the pixel electrodes 13 and common electrodes 14 are not limited to the shapes in the present embodiment, and other possibilities include single "V" shapes, pectinate electrodes formed in straight lines, and any other shapes as long as the electrodes generate a horizontal electric field. A horizontal electric field is generated by applying different voltages between the pectinate pixel electrodes 13 and common electrodes 14. The teeth portions of the pectinate pixel electrodes 13 and common electrodes 14 are disposed in the aperture of the pixel, and are superposed over the transparent continuous solid electrode 16 in a plan view. A contact hole 9 is provided so that the common electrodes 14 are electrically conductive with the common line 2, and a contact hole 8 is provided so that the pixel electrodes 13 are electrically conductive with the drain electrode 5.

An alignment film (not shown) for aligning the liquid crystal molecules is formed on the transparent substrate 17 on which the pixel electrodes 13 and common electrodes 14 are thus formed, and the surface of this alignment film is subjecting to rubbing. A transparent substrate 11 is disposed so as to face the transparent substrate 17, and a color filter (not shown) is formed on the surface of the transparent substrate 11 that faces the transparent substrate 17. Furthermore, an alignment film (not shown) for aligning the liquid crystal molecules is formed on the outermost surface of the transparent substrate 11 that faces the transparent substrate 17, and the surface of this alignment film is subjected to rubbing. The rubbing for the alignment films provided to this pair of transparent substrates 11 and 17 is typically performed in a direction that produces a homogeneous alignment in the liquid crystal molecules. The rubbing direction 10 is perpendicular to the gate line 1 and parallel to the extending direction of the pixel electrodes 13 and common electrodes 14, as shown in FIG. 3. In cases in which pectinate electrodes extending in straight lines are used as the pixel electrodes 13 and common electrodes 14, the rubbing direction 10 must be inclined, for example, by several to several dozen degrees in relation to the extending direction of the comb teeth, and a pretwist angle that is not zero must be provided.

The LCD apparatus of the present embodiment is configured with liquid crystal filled in between the transparent substrates 11 and 17 provided with a TFT and a color filter, respectively, and a liquid crystal layer 12 is sealed in between the substrates as shown in FIG. 4. Polarizing plates (not shown) are provided to both transparent substrates 11 and 17 on the sides opposite those in contact with the liquid crystal layer 12, and this pair of polarizing plates is arranged to form a crossed Nichol prism. The LCD apparatus of the present embodiment also has a light source device (not shown), and light emitted by the light source device passes through the transparent substrate 17, whereby images are displayed.

In the present embodiment, the transparent continuous solid electrode 16 is formed on the same layer as the gate line 1 and the common line 2, but the transparent continuous solid electrode 16 may also be formed between the gate line 1 and the common line 2 via a transparent insulating film. For example, the transparent continuous solid electrode 16 may be formed on the transparent substrate 17, a transparent insulating film may be stacked thereon so as to cover the transparent continuous solid electrode 16, and the gate line 1 and common line 2 may be formed on this transparent insulating film, after which a gate-insulating film may be formed.

Figure 1:
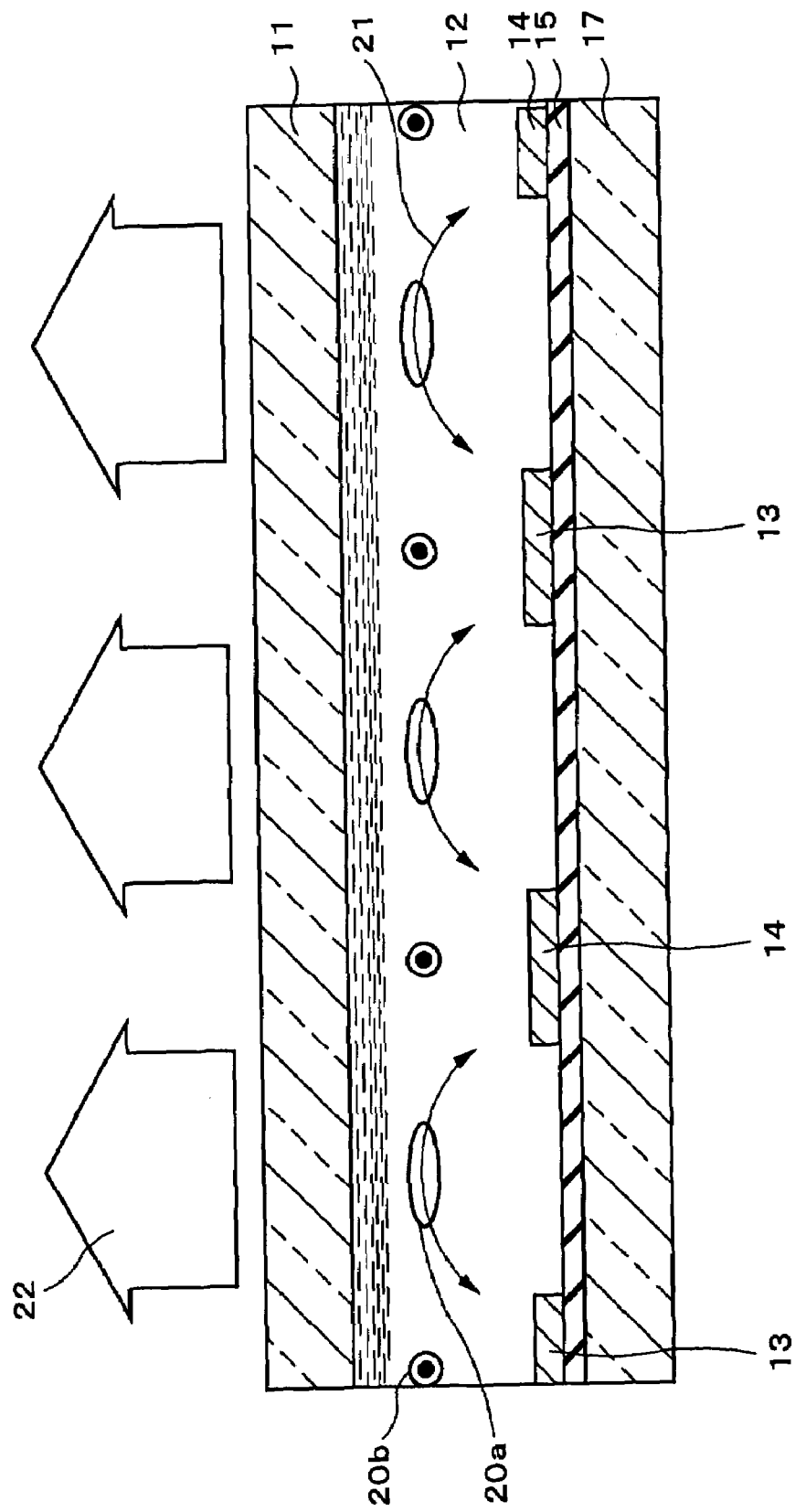
FIG. 1 is a cross-sectional view showing the operation of a related art in-plane switching LCD apparatus.
Figure 2:
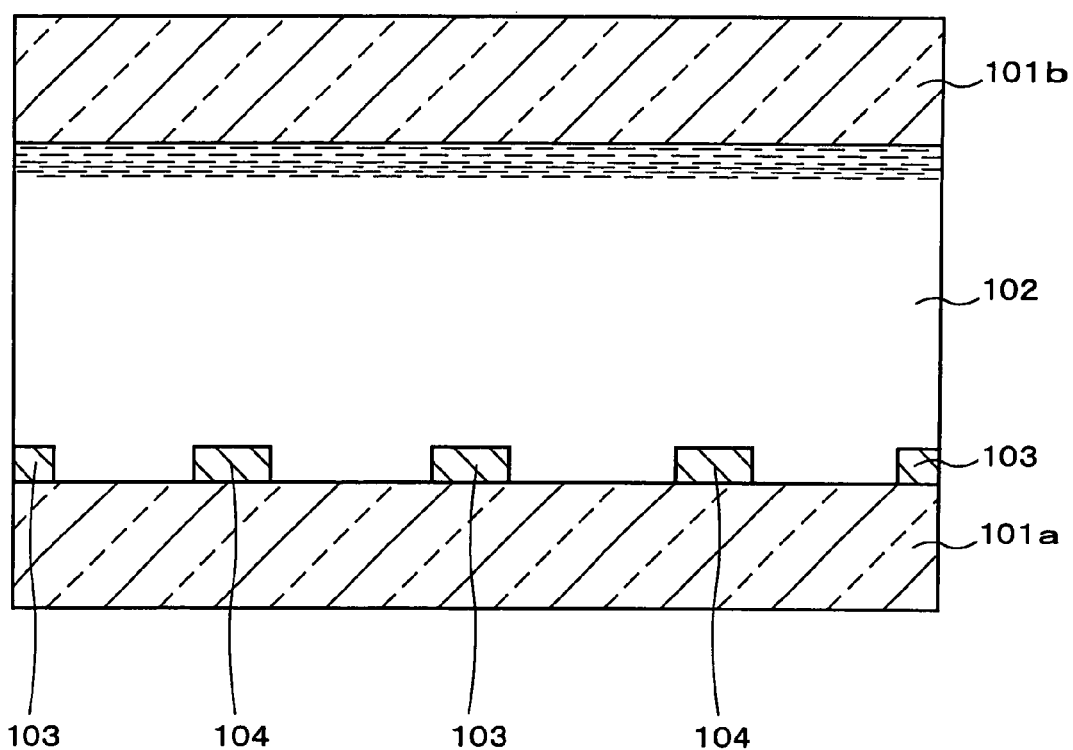
FIG. 2 is a cross-sectional view schematically depicting a pixel of a related art in-plane switching LCD apparatus.

Next, the operation of the present embodiment will be described with reference to FIGS. 3 and 1. The liquid crystal molecules herein are, e.g., liquid crystal molecules having positive dielectric anisotropy, i.e., liquid crystal molecules typically referred to as positive. As shown in FIG. 3, when voltage is not applied between the pixel electrodes 13 and the common electrodes 14, the initial alignment of the liquid crystal molecules is in the same direction as the rubbing direction 10, the major axis direction of the liquid crystal molecules coincides with the direction of axial absorption of the polarizing plates, and the two polarizing plates are arranged so that the axes of absorption are orthogonal to each other. Therefore, light transmissivity is extremely low. When different voltages are applied between the pixel electrodes 13 and common electrodes 14, an electric field is generated substantially parallel to the substrate surfaces and in the shortest direction between the pixel electrodes 13 and common electrodes 14. This electric field is a so-called horizontal electric field. The liquid crystal molecules between the electrodes are driven by this horizontal electric field to rotate within a plane parallel to the substrates, and the alignment of the liquid crystal molecules changes so that the major axes of the liquid crystal molecules are parallel to the horizontal electric field. Therefore, transmissivity is high. Since an example was given in which the shapes of the pixel electrodes 13 and common electrodes 14 are a series of "V" shapes, the direction of the horizontal electric field alternates when crossing the V-shaped curved parts. Therefore, the liquid crystal molecules rotate in the opposite directions on the two sides of the V-shaped curved parts, and the major axes of the liquid crystal molecules become parallel to the direction of the horizontal electric field.

Figure 5:
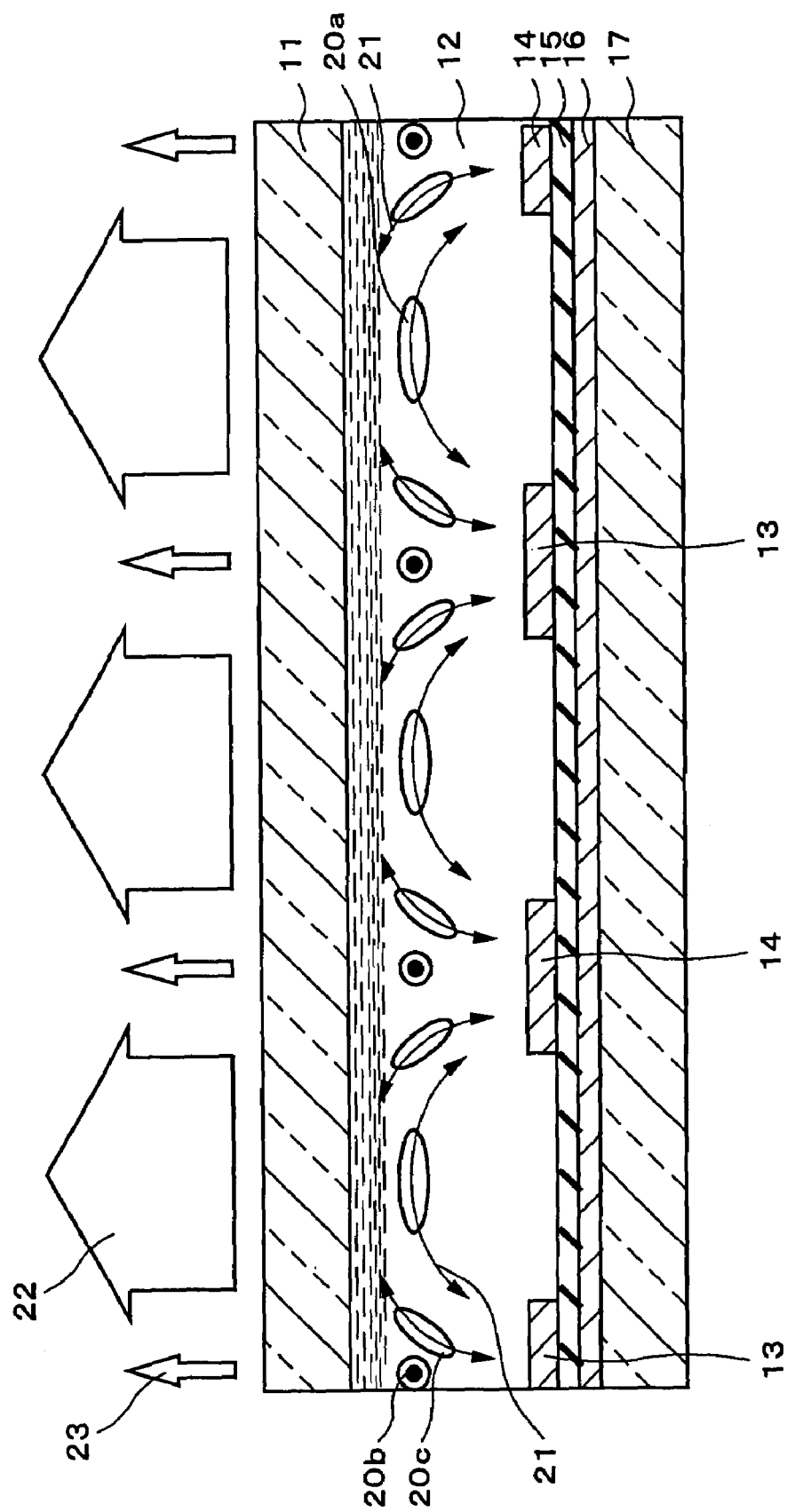
FIG. 5 is a cross-sectional view showing the operation of an exemplary embodiment of the present invention.

FIG. 5 is a cross-sectional view showing the operation of the present embodiment when voltage is applied between the pixel electrodes 13 and common electrodes 14. Structural elements in FIG. 5 that are similar to those in FIG. 4 are denoted by the same numerical symbols and are not described in detail. As shown in FIG. 5, a horizontal electric field substantially parallel to the substrate surfaces is generated in the vicinity of the centers between the pixel electrodes 13 and common electrodes 14, and the major axes of liquid crystal molecules 20a between the electrodes are also substantially parallel to the direction 21 of the horizontal electric field, and are parallel to the substrate surfaces. Therefore, transmissivity is improve d between the pixel electrodes 13 and common electrodes 14, and transmitted light 22 is generated between the pectinate electrodes. Applying different voltages between the pixel electrodes 13 and common electrodes 14 provides the transparent continuous solid electrode 16 with electric potential and generates a horizontal electric field that has vertical components between the transparent continuous solid electrode 16 and the pixel electrodes 13 and common electrodes 14. This horizontal electric field with vertical components also penetrates into the liquid crystal layer 12 and changes the alignment of the liquid crystal molecules so as to increase the brightness of the LCD apparatus. Specifically, above the pixel electrodes 13 and common electrodes 14, this horizontal electric field with vertical components also has electric field components in the horizontal direction parallel to the substrate surfaces. Therefore, the electric field having vertical and horizontal components causes the liquid crystal molecules 20c to rise and to rotate within a plane parallel to the substrate surfaces, and the liquid crystal molecules 20c become inclined in relation to the substrate surfaces. Therefore, the transmissivity above the pixel electrodes 13 and common electrodes 14 is improved, and transmitted light 23 above the pectinate electrodes is generated above the pixel electrodes 13 and common electrodes 14.

Thus, in the present embodiment, an electric potential is imparted to the transparent continuous solid electrode 16, whereby the alignment of the liquid crystal molecules above the pixel electrodes 13 and common electrodes 14 is changed and transmissivity is improved. Such an improvement in transmissivity above the electrodes is not achieved in conventional in-plane switching LCD apparatuses. FIG. 1 is a cross-sectional view showing the operation of a conventional in-plane switching LCD apparatus. As shown in FIG. 1, a transparent continuous solid electrode is not provided as in the present embodiment, and the electric field above the pixel electrodes 13 and common electrodes 14 is therefore not horizontal. Accordingly, the liquid crystal molecules cannot be sufficiently rotated and transmissivity is low. Therefore, transmitted light is generated primarily between the pixel electrodes 13 and common electrodes 14. Structural elements in FIG. 1 that are similar to those in FIG. 5 are denoted by the same numerical symbols and are not described in detail.

The transparent continuous solid electrode 16 is in an electrically floating state, but a normally black in-plane switching LCD apparatus may be structured so that a suitable voltage is applied to the transparent continuous solid electrode 16 when an electric field is applied to the liquid crystal layer to light the screen, or that the transparent continuous solid electrode 16 has the same electric potential as the common electrodes 14.

Next, the effects of the present embodiment will be described. In the in-plane switching active matrix LCD apparatus according to the present embodiment, a transparent continuous solid electrode 16 is formed via a transparent insulating film 15 below the pectinate pixel electrodes 13 and common electrodes 14 formed in a pixel, whereby the transparent continuous solid electrode 16 is provided with an electric potential while the liquid crystal is driven, a horizontal electric field having vertical components generated between the transparent continuous solid electrode 16 and the pixel electrodes 13 and common electrodes 14 also penetrates into the liquid crystal layer 12, and the alignment of the liquid crystal molecules is varied so as to increase the brightness of the LCD apparatus. Specifically, a simple structure is provided in which transparent electrodes are arranged in continuous solid fashion in the pixel apertures, whereby the liquid crystal layer 12 can be subjected to an electric field that provides higher transmissivity than the horizontal electric field in the conventional structure, and the transmissivity can be improved without changing the width and/or spaces between the pectinate electrodes. The contrast also improves proportionate to the improvement in transmissivity.

Various modifications can be made to the present invention within the technical scope based on the claims, and the technical scope of the present invention is not in any way limited by the embodiments of the present invention.

What is claimed is:

1. An in-plane switching active matrix liquid crystal display apparatus, comprising:
   a first substrate;
   a second substrate facing the first substrate;
   a liquid crystal layer provided between the first and second substrates;
   data lines and gate lines that are formed on the first substrate and that intersect in matrix fashion;
   a thin-film transistor formed on the first substrate in each of a plurality of pixel areas partitioned by the data lines and gate lines;
   a common line formed on the first substrate and used to apply a reference potential across a plurality of pixels;
   pixel electrodes and common electrodes formed in the plurality of pixel areas on the first substrate and used to generate a horizontal electric field parallel to a surface of the first substrate; and
   a transparent continuous solid electrode formed via a transparent insulating layer on bottom layers of the pixel electrodes and common electrodes on the first substrate.

2. The in-plane switching active matrix liquid crystal display apparatus according to claim 1, wherein the transparent continuous solid electrode is in an electrically floating state.

3. The in-plane switching active matrix liquid crystal display apparatus according to claim 1, wherein the transparent continuous solid electrode is formed uniformly such that apertures of the pixels are covered.

4. The in-plane switching active matrix liquid crystal display apparatus according to claim 2, wherein the transparent continuous solid electrode is formed uniformly such that apertures of the pixels are covered.

5. The in-plane switching active matrix liquid crystal display apparatus according to claim 1, wherein the pixel electrodes and the common electrodes comprise transparent electrodes.

6. The in-plane switching active matrix liquid crystal display apparatus according to claim 2, wherein the pixel electrodes and the common electrodes comprise transparent electrodes.

7. The in-plane switching active matrix liquid crystal display apparatus according to claim 1, wherein the pixel electrodes and the common electrodes are formed in pectinate shapes that mesh with each other.

8. The in-plane switching active matrix liquid crystal display apparatus according to claim 2, wherein the pixel electrodes and the common electrodes are formed in pectinate shapes that mesh with each other.

9. The in-plane switching active matrix liquid crystal display apparatus according to claim 1, wherein the pixel electrodes are formed on a layer that comprises the common electrodes.

10. The in-plane switching active matrix liquid crystal display apparatus according to claim 2, wherein the pixel electrodes are formed on a layer that comprises the common electrodes.

11. The in-plane switching active matrix liquid crystal display apparatus according to claim 1, wherein the transparent continuous solid electrode is formed on a layer that comprises the gate lines and the common line.

12. The in-plane switching active matrix liquid crystal display apparatus according to claim 2, wherein the transparent continuous solid electrode is formed on a layer that comprises the gate lines and the common line.

13. The in-plane switching active matrix liquid crystal display apparatus according to claim 1, wherein the transparent continuous solid electrode is formed between the gate lines and common line via the transparent insulating layer.

14. The in-plane switching active matrix liquid crystal display apparatus according to claim 2, wherein the transparent continuous solid electrode is formed between the gate lines and common line via the transparent insulating layer.

15. The in-plane switching active matrix liquid crystal display apparatus according to claim 1, wherein the transparent continuous solid electrode is disposed on a bottom surface of the transparent insulating layer.

16. The in-plane switching active matrix liquid crystal display apparatus according to claim 1, wherein the transparent continuous solid electrode is directly formed on the first substrate.

17. The in-plane switching active matrix liquid crystal display apparatus according to claim 1, wherein the transparent continuous solid electrode is formed to be electrically insulated from the gate lines and the common line.

18. The in-plane switching active matrix liquid crystal display apparatus according to claim 1, wherein the transparent insulating film is stacked to cover the data lines and the transparent continuous solid electrode.

19. The in-plane switching active matrix liquid crystal display apparatus according to claim 7, wherein teeth portions of the pixel and common electrodes are disposed in apertures of the pixels.

20. The in-plane switching active matrix liquid crystal display apparatus according to claim 1, wherein the pixel and common electrodes are parallel to each other.

* * * * *